(12) United States Patent
Park (10) Patent No.: US 9,673,644 B2
(45) Date of Patent: Jun. 6, 2017

(54) BATTERY MODULE HAVING OVERCHARGE PREVENTING DEVICE, AND OVERCHARGE PREVENTING DEVICE FOR BATTERY MODULE

(71) Applicant: HYUNDAI MOBIS Co., Ltd, Seoul (KR)

(72) Inventor: Yun Su Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 188 days.

(21) Appl. No.: 14/602,626

(22) Filed: Jan. 22, 2015

(65) Prior Publication Data
US 2016/0118823 A1    Apr. 28, 2016

(30) Foreign Application Priority Data
Oct. 28, 2014  (KR) .................. 10-2014-0147682

(51) Int. Cl.
*H02J 7/00*   (2006.01)

(52) U.S. Cl.
CPC .......... *H02J 7/0042* (2013.01); *H02J 7/0029* (2013.01); *H02J 2007/0037* (2013.01)

(58) Field of Classification Search
CPC .......... H01M 10/4207; H01M 10/425; H01M 10/482; H01M 10/0413; H01M 10/0468; H01M 10/613; H01M 10/647; H01M 10/6554; H01M 10/6555; H01M 10/658; H01M 2/1077; H01M 2/1241; H02J 7/0042
See application file for complete search history.

(56) References Cited

U.S. PATENT DOCUMENTS

| 8,168,317 | B2 | 5/2012 | Yoon et al. |
| 8,547,069 | B2 | 10/2013 | Jang |
| 2009/0053585 | A1* | 2/2009 | Nakazawa .......... H01M 2/1077 429/56 |
| 2010/0247980 | A1 | 9/2010 | Jang et al. |
| 2013/0022859 | A1 | 1/2013 | Lim |

FOREIGN PATENT DOCUMENTS

| KR | 10-2009-0013867 A | 2/2009 |
| KR | 10-2011-0008480 A | 1/2011 |
| KR | 10-2013-0011740 A | 1/2013 |

* cited by examiner

*Primary Examiner* — Vuthe Siek
(74) *Attorney, Agent, or Firm* — NSIP Law (57) ABSTRACT

The present invention relates to a battery module mounted with an overcharge preventing device, and an overcharge preventing device for a battery module. The battery module mounted with an overcharge preventing device of the present invention includes: a battery cell including a first battery cell and a second battery cell, which are spaced apart from each other; and an overcharge preventing device inserted and disposed between the first battery cell and the second battery cell, and configured to block power supplied to the battery cell when the battery cell is expanded according to overcharge, in which the overcharge preventing device is configured as one module separately from the battery cell, and is replaceably disposed between the first battery cell and the second battery cell, which are spaced apart from each other.

20 Claims, 7 Drawing Sheets

BATTERY MODULE HAVING OVERCHARGE PREVENTING DEVICE, AND OVERCHARGE PREVENTING DEVICE FOR BATTERY MODULE

CROSS-REFERENCE TO RELATED APPLICATIONS

This application claims priority under 35 U.S.C. §119 to Korean Patent Application No. 10-2014-0147682, filed on Oct. 28, 2014, in the Korean Intellectual Property Office, the disclosure of which is incorporated herein by reference in its entirety.

TECHNICAL FIELD

The present invention relates to an overcharge preventing device, and more particularly, to a battery module mounted with an overcharge preventing device, which blocks power supplied to a battery when the battery is overcharged, and an overcharge preventing device for a battery module.

BACKGROUND

In general, a hybrid vehicle in a broad sense means a vehicle driven by efficiently combining two or more different kinds of power sources, but in most cases, means a vehicle obtaining driving force from an engine, which is driven by fuel, and an electric motor, which is driven by power of a battery, and is called a hybrid electric vehicle (HEV).

A high voltage battery for providing driving force of the electric motor is essentially mounted in the hybrid electric vehicle and the like, and the high voltage battery supplies necessary power while repeating charging/discharging during travelling of the vehicle.

A high-output lithium ion (polymer) battery (LiPB) is widely used as the high-voltage battery in the hybrid electric vehicle, and the lithium ion battery has a problem below.

Particularly, when the lithium ion battery is overcharged, flammable gas is generated by decomposition of an electrolyte which is an exothermic reaction, and thus an interval pressure of the battery is increased to accompany an increase in a thickness of the battery. Thus, a temperature is increased and a short of circuit is incurred, and flammable gas is ignited and causes a fire, thereby causing a fatal result to safety of a driver and a vehicle.

Particularly, in a battery of a hybrid vehicle or a fuel cell vehicle, a plurality of batteries is modulated and mounted for a high voltage, so that there is a high possibility that a problem is incurred in safety when overcharge and ignition are incurred.

In order to prevent the battery from being overcharged, a stable and preventing device having various structures has been developed.

However, in the battery overcharge preventing device in the related art, a battery cell is damaged when the battery cell configuring a battery module is expanded, so that there is a problem in that poisonous gas is discharged to the outside to cause environmental pollution.

The battery overcharge preventing device in the related art has a complex structure for being mounted in the battery module, and is difficult to be replaced.

RELATED ART LITERATURE

Patent Document

Korean Patent Application Laid-Open No. 10-2009-0013867

SUMMARY

The present invention has been made in an effort to provide a battery module mounted with an overcharge preventing device which is capable of blocking power without causing the damage to a battery cell when the battery cell is overcharged, and is easily mounted to the battery module or replaceable, and an overcharge preventing device for a battery module.

An exemplary embodiment of the present invention provides a battery module mounted with an overcharge preventing device, including: a battery cell including a first battery cell and a second battery cell, which are spaced apart from each other; and an overcharge preventing device inserted and disposed between the first battery cell and the second battery cell, and configured to block power supplied to the battery cell when the battery cell is expanded according to overcharge, in which the overcharge preventing device is configured as one module separately from the battery cell, and is replaceably disposed between the first battery cell and the second battery cell, which are spaced apart from each other.

The overcharge preventing device may include: a frame disposed between the first battery cell and the second battery cell; and a bus bar disposed at an inner side of the frame, and having one end connected to the first battery cell and the other end connected to the second battery cell to make the first battery cell and the second battery cell be electrically conducted, and the bus bar may be cut by expansion of the battery cell.

The overcharge preventing device may further include: a first plate having one surface, which is in contact with the first battery cell, and the other surface, on which the bus bar is seated; and a second plate having one surface, which is in contact with the second battery cell, and the other surface, which faces the other surface of the first plate with the bus bar interposed therebetween, and a cutter, which moves in a direction of the bus bar to cut the bus bar when the battery cell is expanded, may be formed on the other surface of the second plate.

A plurality of seating protrusions, on which the bus bar is seated, may protrude from the other surface of the first plate, and a plurality of seating protrusions, on which the bus bar is seated, may protrude from the other surface of the first plate, and the cutter may be disposed between the seating protrusions.

A weak part, which is cut by the cutter, may be formed at the bus bar, and the weak part may have a small width in a vertical direction of a movement direction of the cutter.

The bus bar may be fixedly coupled to the first plate.

An insertion hole, in which the first plate and the second plate are inserted and disposed, may pass through inside the frame, and the first plate and the second plate may be spaced apart from each other inside the insertion hole, and when the battery cell is expanded, the first plate and the second plate may be deformed in a direction in which the first plate and the second plate are close to each other.

Spacing protrusions, on which the other surface of the first plate and the other surface of the second plate are seated to be spaced apart from each other, may be formed inside the frame, at which the insertion hole is formed.

Reinforcing ribs may be formed in the first plate and the second plate, respectively, and a deformation part, at which the reinforcing rib is not formed, may exist at a center part of the second plate, and the cutter may be formed at the deformation part.

The battery module may further include: a first cover disposed at an external side of the first battery cell; and a second cover disposed at an external side of the second battery cell, in which when the battery cell is expanded, the first battery cell is restricted from being expanded by the first cover to be expanded in a direction of the overcharge preventing device, and the second battery cell is restricted from being expanded by the second cover to be expanded in the direction of the overcharge preventing device.

The first plate, the second plate, and the cutter may be formed of an insulating material.

Another exemplary embodiment of the present invention provides an overcharge preventing device for a battery module, which is disposed between a first battery cell and a second battery cell configuring a battery cell in a battery module configured by the plurality of battery cell to block power supplied to the battery cell when the battery cell is expanded according to overcharge, the overcharge preventing device including: a frame disposed between the first battery cell and the second battery cell; and a bus bar disposed at an inner side of the frame, and having one end connected to the first battery cell and the other end connected to the second battery cell to make the first battery cell and the second battery cell be electrically conducted, in which the bus bar is cut by the expansion of the battery cell.

The overcharge preventing device may further include: a first plate having one surface, which is in contact with the first battery cell, and the other surface, on which the bus bar is seated; and a second plate having one surface, which is in contact with the second battery cell, and the other surface, which faces the other surface of the first plate with the bus bar interposed therebetween, and a cutter, which moves in a direction of the bus bar to cut the bus bar when the battery cell is expanded, may be formed on the other surface of the second plate.

A plurality of seating protrusions, on which the bus bar is seated, may protrude from the other surface of the first plate, and a plurality of seating protrusions, on which the bus bar is seated, may protrude from the other surface of the first plate, and the cutter may be disposed between the seating protrusions.

A weak part, which is cut by the cutter, may be formed at the bus bar, and the weak part may have a small width in a vertical direction of a movement direction of the cutter.

The bus bar may be fixedly coupled to the first plate.

An insertion hole, in which the first plate and the second plate are inserted and disposed, may pass through inside the frame, and the first plate and the second plate may be spaced apart from each other inside the insertion hole, and when the battery cell is expanded, the first plate and the second plate may be deformed in a direction in which the first plate and the second plate are close to each other.

Spacing protrusions, on which the other surface of the first plate and the other surface of the second plate are seated to be spaced apart from each other, may be formed inside the frame, at which the insertion hole is formed.

Reinforcing ribs may be formed in the first plate and the second plate, respectively, and a deformation part, at which the reinforcing rib is not formed, may exist at a center part of the second plate, and the cutter may be formed at the deformation part.

The first plate, the second plate, and the cutter may be formed of an insulating material.

According to the exemplary embodiment of the present invention, the battery module mounted with the overcharge preventing device, and the overcharge preventing device for the battery module have effects below.

The overcharge preventing device of the present invention is capable of block power without causing the damage to a battery cell.

Since the overcharge preventing device is configured as one module separately from a battery cell, it is easy to mount and replace the overcharge preventing device.

DETAILED DESCRIPTION OF EMBODIMENTS

Various advantages and features of the present disclosure and methods accomplishing thereof will become apparent from the following detailed description of exemplary embodiments with reference to the accompanying drawings. However, the present invention is not limited to the exemplary embodiment disclosed herein but will be implemented in various forms. The exemplary embodiments are provided so that the present invention is completely disclosed, and a person of ordinary skilled in the art can fully understand the scope of the present invention. Therefore, the present invention will be defined only by the scope of the appended claims. Meanwhile, terms used in the present invention are to explain exemplary embodiments rather than limiting the present invention. Unless particularly stated otherwise in the present specification, a singular form also includes a plural form. The meaning of "comprises" and/or "comprising" used in this specification does not exclude the existence or addition of aforementioned constituent elements, steps, operations, and/or device, and one or more other constituent elements, steps, operations, and/or devices.

Figure 1:
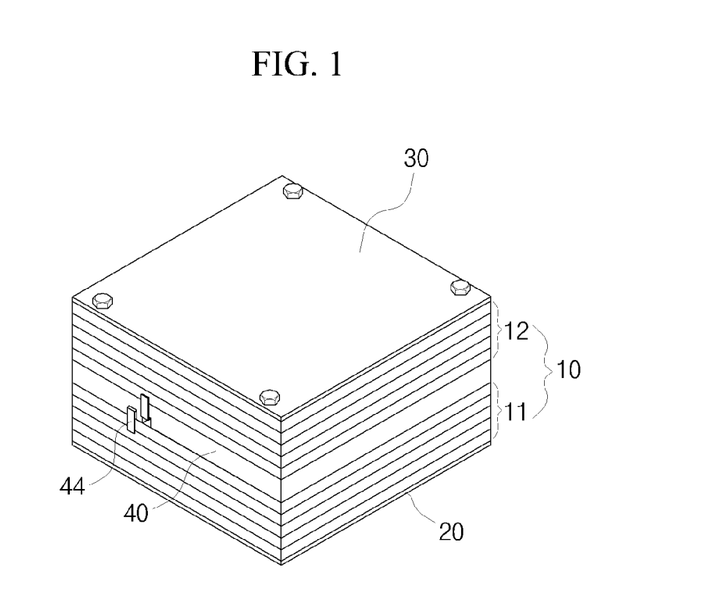
FIG. 1 is a perspective view of a battery module mounted with an overcharge preventing device according to an exemplary embodiment of the present invention.
Figure 2:
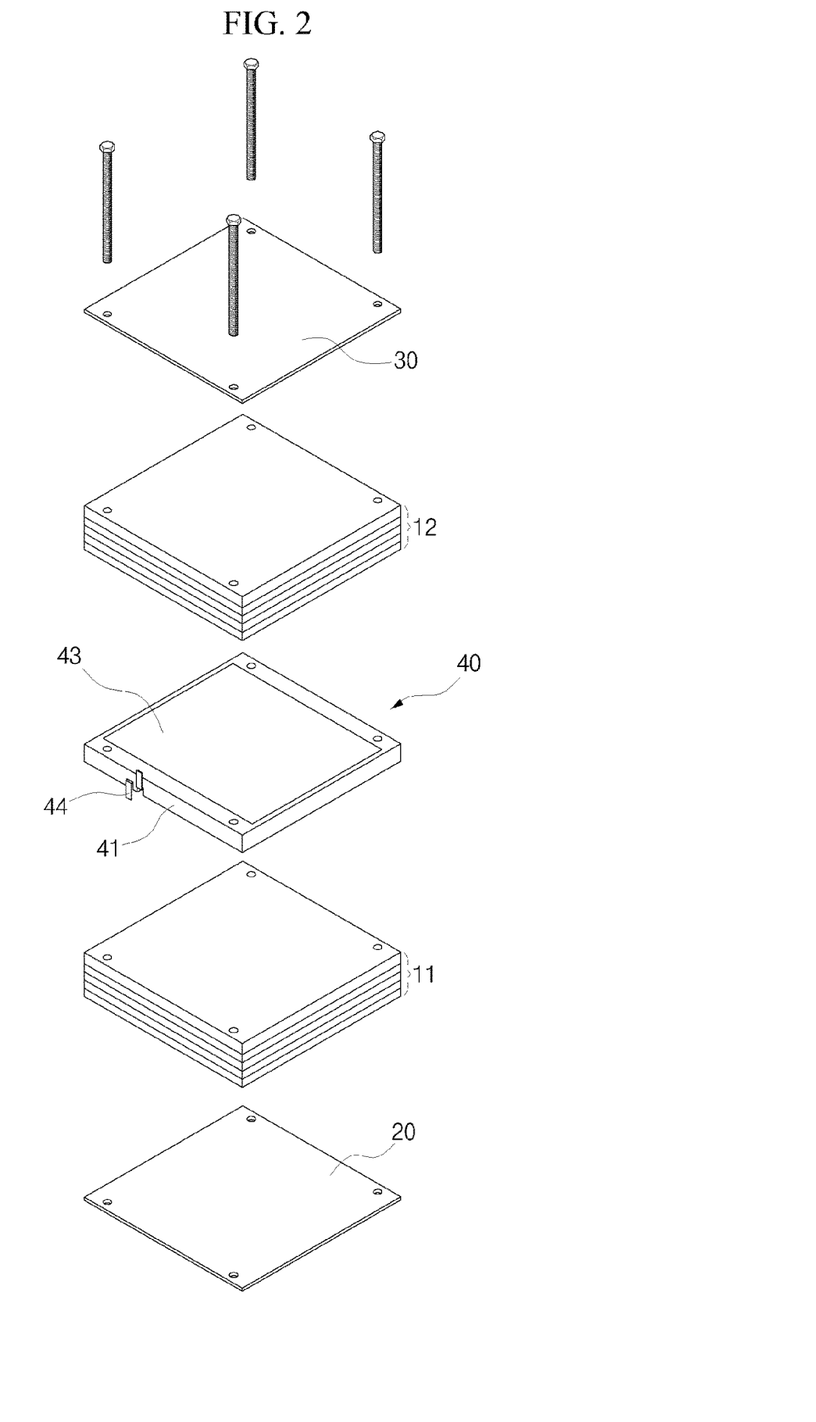
FIG. 2 is an exploded perspective view of the battery module mounted with the overcharge preventing device according to the exemplary embodiment of the present invention.
Figure 3:
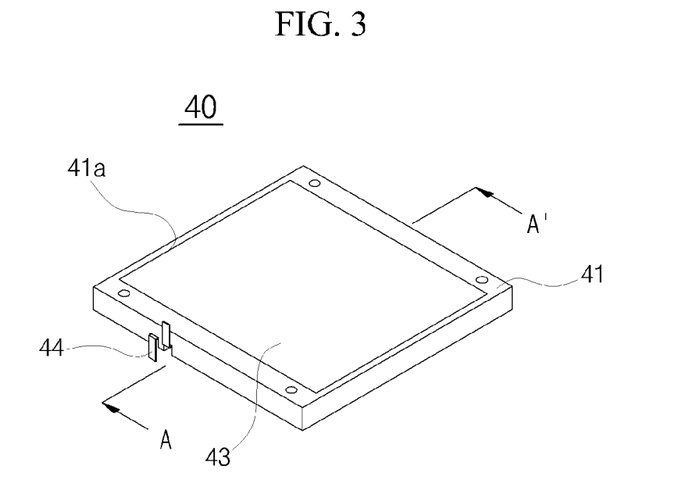
FIG. 3 is a perspective view of the overcharge preventing device according to the exemplary embodiment of the present invention.
Figure 4:
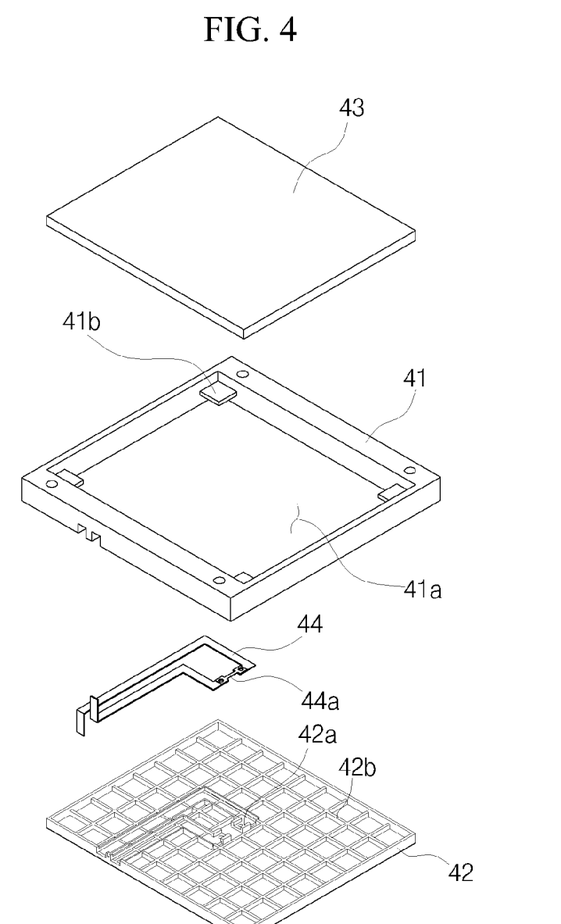
FIG. 4 is an exploded perspective view of the overcharge preventing device according to the exemplary embodiment of the present invention in one direction.
Figure 5:
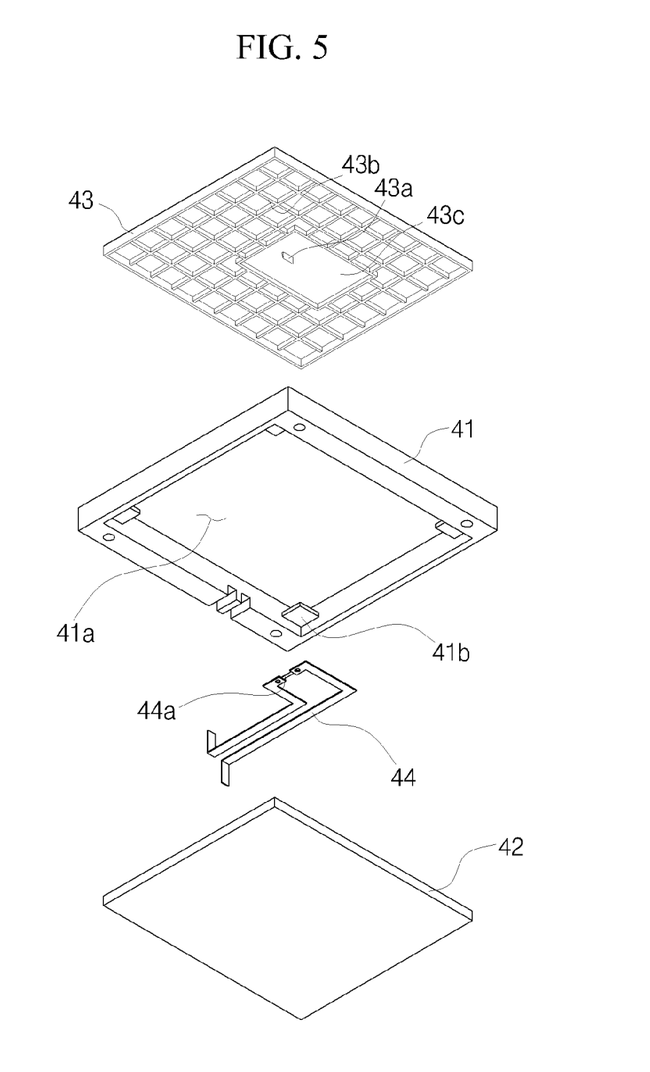
FIG. 5 is an exploded perspective view of the overcharge preventing device according to the exemplary embodiment of the present invention in the other direction.
Figure 6:
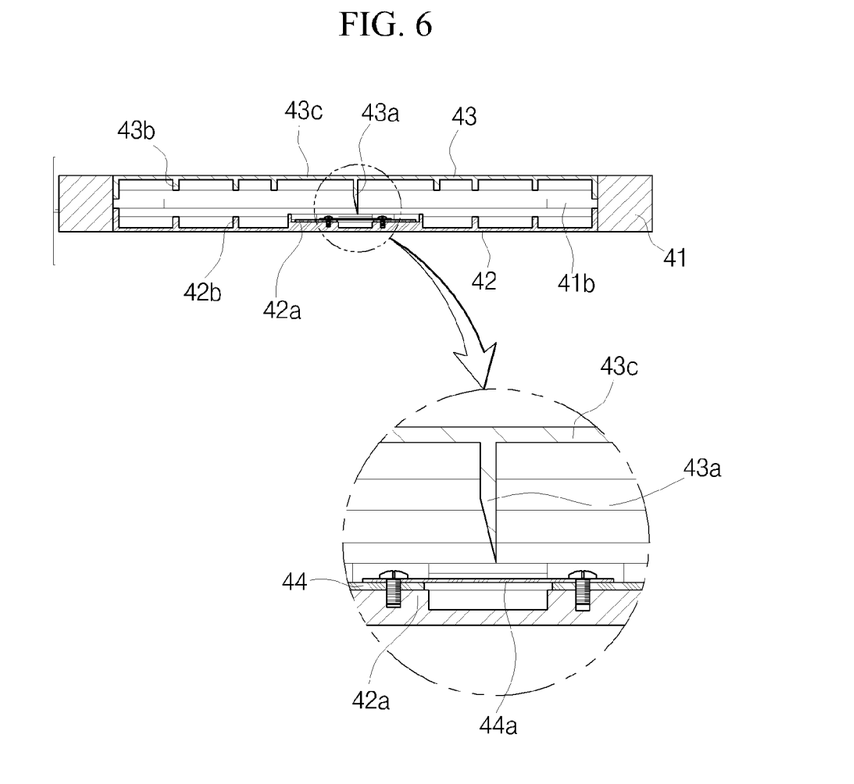
FIG. 6 is a cross-sectional view taken along line A-A' of FIG. 3.
Figure 7:
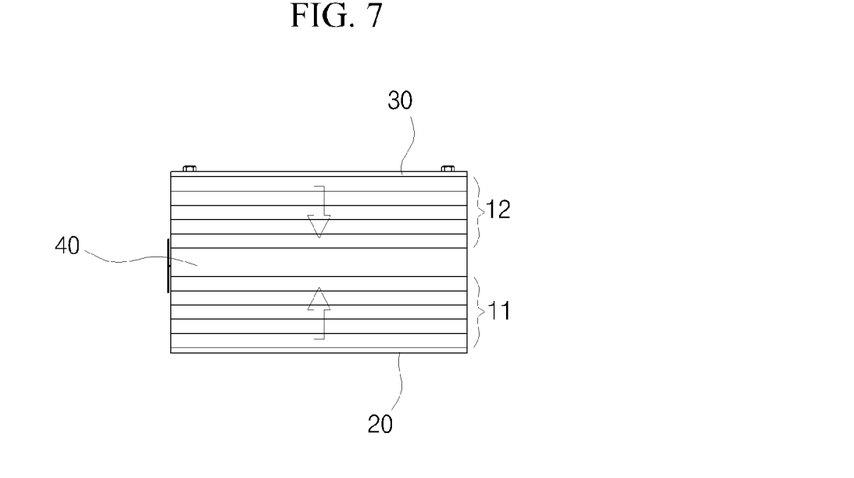
FIG. 7 is a lateral-surface structural diagram illustrating an operation direction of expansion pressure when the battery cell is expanded in the battery module mounted with the overcharge preventing device according to the exemplary embodiment of the present invention.
Figure 8:
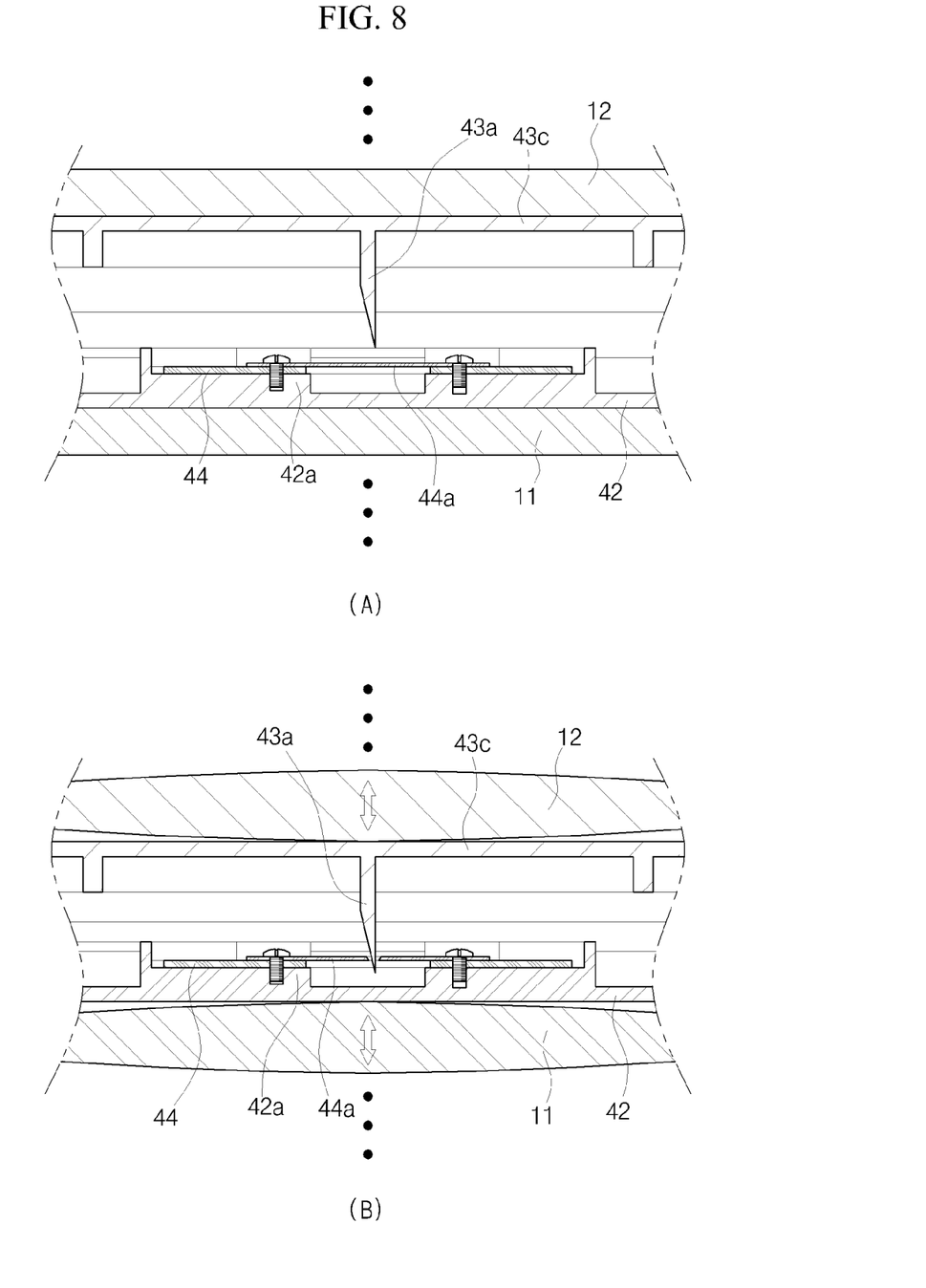
FIG. 8 is an operation process diagram illustrating a relationship between a cutter and a bus bar when the battery cell is expanded in the battery module mounted with the overcharge preventing device according to the exemplary embodiment of the present invention.

FIG. 1 is a perspective view of a battery module mounted with an overcharge preventing device according to an exemplary embodiment of the present invention, FIG. 2 is an exploded perspective view of the battery module mounted with the overcharge preventing device according to the exemplary embodiment of the present invention, FIG. 3 is a perspective view of the overcharge preventing device according to the exemplary embodiment of the present invention, FIG. 4 is an exploded perspective view of the overcharge preventing device according to the exemplary embodiment of the present invention in one direction, FIG. 5 is an exploded perspective view of the overcharge preventing device according to the exemplary embodiment of the present invention in the other direction, FIG. 6 is a cross-sectional view taken along line A-A' of FIG. 3, FIG. 7 is a lateral-surface structural diagram illustrating an operation direction of expansion pressure when the battery cell is expanded in the battery module mounted with the overcharge preventing device according to the exemplary embodiment of the present invention; and FIG. 8 is an operation process diagram illustrating a relationship between a cutter and a bus bar when the battery cell is expanded in the battery module mounted with the overcharge preventing device according to the exemplary embodiment of the present invention.

As illustrated in FIGS. 1 to 8, the battery module mounted with the overcharge preventing device includes a battery cell 10, a first cover 20, a second cover 30, and an overcharge preventing device 40.

The battery cell 10 is configured by stacking a plurality of battery cells, and in the present exemplary embodiment, the battery cell 10 is divided into a first battery cell 11 and a second battery cell 12, which are spaced apart from each other.

Structures, functions, and the like of the first battery cell 11 and the second battery cell 12 are the same, and the battery cell 10 is divided into two battery cells for describing the present invention, and the number of battery cells is not limited.

In the drawings of the present exemplary embodiment, the first battery cell 11 is disposed at a lower side, and the second battery cell 12 is disposed at an upper side.

The first cover 20 is disposed at an outer side of the first battery cell 11, and the second cover 30 is disposed at an outer side of the second battery cell 12.

That is, the first cover 20 and the second cover 30 is disposed at an outer side of the battery cell 10 formed of the first battery cell 11 and the second battery cell 12.

The first cover 20 is in contact with the external side of the first battery cell 11 to restrict a volume of the first battery cell 11 from being expanded to the outside when the first battery cell 11 is expanded.

The second cover 30 is in contact with the external side of the second battery cell 12 to restrict a volume of the second battery cell 12 from being expanded to the outside when the second battery cell 11 is expanded.

The overcharge preventing device 40 is inserted and disposed between the first battery cell 11 and the second battery cell 12 to block power supplied to the battery cell 10 when the battery cell 10 is expanded according to overcharging.

The overcharge preventing device 40 is configured as one module separately from the battery cell 10 to be replaceably disposed between the first battery cell 11 and the second battery cell 12.

That is, the overcharge preventing device 40 is configured by one separate module, so that the overcharge preventing device 40 is not coupled to the battery cell 10 and is independently mounted, and is only in surface-contact with the battery cell 10.

As illustrated in FIGS. 4 and 5, the overcharge preventing device 40 includes a frame 41, a first plate 42, a second plate 43, and a bus bar 44.

The frame 41 is formed of plastic, which is an insulator, and the like, and is disposed between the first battery cell and the second battery cell 12.

The frame 41 is formed in an approximately quadrangular plate, and an insertion hole 41a passes through an inner side of the frame 41.

The first plate 42 has a plate shape, and one surface thereof is in contact with the first battery cell 11.

The second plate 43 has a plate shape, and one surface thereof is in contact with the second battery cell 12.

The first plate 42 and the second plate 43 are inserted into and disposed at the insertion hole 41a, which is formed at the inner side of the frame 41.

Depending on a case, the first plate 42 and the second plate 43 may also be disposed at an outer side of the frame 41, not the inner side of the frame 41.

The other surface of the first plate 42 and the other surface of the second plate 43, which are inserted into and disposed at the insertion hole 41a, are spaced apart from each other.

Accordingly, when the battery cell 10 is expanded, the first plate 42 and the second plate 43 are deformed in a direction in which the first plate 42 and the second plate 43 are adjacent to each other.

Spacing protrusions 41b, on which the other surface of the first plate 42 and the other surface of the second plate 43 are seated to be spaced apart from each other, are formed at the inner side of the frame 41, at which the insertion hole 41a is formed.

In the present exemplary embodiment, the spacing protrusions 41b are formed at apexes of the frame 41, so that the first plate 42 and the second plate 43 are seated at both sides of the frame 41.

The bus bar 44 is disposed at the inner side of the frame 41, and one end of the bus bar 44 is connected to the first battery cell 11 and the other end of the bus bar 44 is connected to the second battery cell 12 to make the first battery cell 11 and the second battery cell 12 be electrically conducted.

The bus bar 44 normally makes a current flow between the first battery cell 11 and the second battery cell 12, but the bus bar 44 is cut due to the expansion of the battery cell 10 to block the first battery cell 11 and the second battery cell 12 from being electrically conducted.

The bus bar 44 is seated on the other surface of the first plate 42.

The bus bar 44 is fixedly coupled to the other surface of the first plate 42 by a screw and the like.

In this case, a plurality of seating protrusions 42a, on which the bus bar 44 is seated, protrudes from the other surface of the first plate 42.

The bus bar 44 is spaced apart from the other surface of the first plate 42 by the seating protrusions 42a.

The other surface of the second plate 43 faces the other surface of the first plate 42 with the bus bar 44 interposed therebetween.

The cutter 43a, which moves in a direction of the bus bar 44 when the battery cell 10 is expanded to cut the bus bar 44, is formed on the other surface of the second plate 43.

The cutter 43a is disposed at a corresponding position between the plurality of seating protrusions 42a, so that the bus bar 44 spaced apart from the first plate 42 by the seating protrusions 42a may be more easily cut when the cutter 43a moves.

In the present exemplary embodiment, the cutter 43a is formed in a triangular shape, so that a keen corner faces the bus bar 44.

In order to easily cut the bus bar 44, a weak part 44a, which is cut by the cutter 43a, is formed at the bus bar 44.

In the present exemplary embodiment, the weak part 44a is formed to have a small width in a vertical direction of a movement direction of the cutter 43a, but may also be formed in other shapes.

The weak part 44a may be detachably coupled to other portion of the bus bar 44, so that the weak part 44a may be newly replaced and used when being cut.

Reinforcing ribs 42b and 43b are formed at the first plate 42 and the second plate 43, respectively.

When the battery cell 10 is expanded, the first plate 42 and the second plate 43 are not easily deformed at portions where the reinforcing ribs 42b and 43b are formed.

A deformation part 43c, at which the reinforcing rib 43b is not formed, exists at a center part of the second plate 43, and the cutter 43a is formed at the deformation part 43c.

Accordingly, when the battery cell 10 is expanded at other parts, not a center, thereof, the first plate 42 and the second plate 43 are not deformed at the portions where the reinforcing ribs 42b and 43b are formed, so that the expansion force moves toward the deformation part 43c to apply force to the deformation part 43c, thereby moving the cutter 43a.

When the cutter 43a moves in the direction of the bus bar 44, the weak part 44a of the bus bar 44 is cut by the cutter 43a, so that power is blocked.

In this case, the first plate 42, the second plate 43, and the cutter 43a are formed of an insulating material.

In the meantime, when the battery cell 10 is expanded, the first battery cell 11 is restricted from being expanded in a direction of the first cover 20 by the first cover 20 to be expanded in a direction of the overcharge preventing device 40, and the second battery cell 12 is restricted from being expanded in a direction of the second cover 30 by the second cover 30 to be expanded in the direction of the overcharge preventing device 40.

Accordingly, the expansion force of the battery cell 10 may be concentrated to the overcharge preventing device 40, and an appearance of the battery module may be prevented from being deformed.

Hereinafter, an operation process of the present invention including the aforementioned configuration will be described.

In a normal state, the cutter 43a and the bus 44 are spaced apart from each other as illustrated in FIGS. 6 and 8A, so that the bus bar 44 makes the first battery cell 11 and the second battery cell 12 be electrically conducted.

When the battery module is overcharged, the battery cell 10 is expanded.

In this case, since the first cover 20 and the second cover 30 are mounted at both sides of the battery cell 10, the battery cell 10 cannot be expanded to both sides, and an expansion pressure of the battery cell 10 is applied to the inner side at which the overcharge preventing device 40 is disposed as indicated by an arrow in FIG. 7.

Accordingly, the overcharge preventing device 40 may more rapidly and accurately receive the expansion pressure of the battery cell 10.

According to the expansion of the battery cell 10, the expansion pressure is applied to a direction close to the first plate 42 and/or the second plate 43.

Accordingly, as illustrated in FIG. 8B, the cutter 43a may move in the direction of the bus bar 44 and cut the weak part 44a of the bus bar 44.

Accordingly, when the bus bar 44, which electrically connects the first battery cell 11 and the second battery cell 12, is cut, the supply of electricity to the battery cell 10 is blocked, thereby preventing the battery from being further overcharged.

In the meantime, when the bus bar 44 is cut, an operator may replace the overcharge preventing device 40, which is formed by one module separately from the battery cell 10, with a new one. Otherwise, the operator may replace only the weak part 44a of the bus bar 44.

As described above, the overcharge preventing device 40 of the present invention is disposed inside the battery module without being exposed to an exterior appearance of the battery module, so that it is possible to prevent a secondary problem due to generation of a spark when the overcharge preventing device 40 is operated.

The battery module mounted with the overcharge preventing device and the overcharge preventing device for the battery module of the present invention are not limited to the aforementioned exemplary embodiment, and variously modified and carried out within an allowed scope of the technical spirit of the present invention.

What is claimed is:

1. A battery module, comprising:
   a battery cell comprising a first battery cell and a second battery cell spaced from the first battery cell; and
   an overcharge preventing device configured to block power supplied to the battery cell when the battery cell is expanded due to overcharge, wherein the overcharge preventing device comprises
   a frame disposed between the first battery cell and the second battery cell,
   a first plate disposed in the frame and contacting the first battery cell,
   a second plate disposed in the frame and contacting the second battery cell,
   a bus bar disposed on the first plate, and
   a cutter disposed on the second plate and configured to cut the bus bar in response to expansion of the battery cell.

2. The battery module of claim 1, wherein:
   the bus bar is disposed at an inner side of the frame, and comprises one end connected to the first battery cell and another end connected to the second battery cell to make the first battery cell and the second battery cell be electrically conducted.

3. The battery module of claim 2, wherein:
   the first plate comprises a first surface contacting the first battery cell, and a second surface on which the bus bar is seated;
   the second plate comprises a first surface contacting the second battery cell, and a second surface facing the second surface of the first plate with the bus bar interposed between the second surface of the second plate and the second surface of the first plate; and
   the cutter is formed on the second surface of the second plate, and is configured to move towards the bus bar to cut the bus bar in response to expansion of the battery cell.

4. The battery module of claim 3, wherein:
the frame comprises an insertion hole passing through the frame;
the first plate and the second plate are inserted in the insertion hole and spaced apart from each other inside the insertion hole; and
the first plate and the second plate are configured to deform in a direction in which the first plate and the second plate face each other, in response to expansion of the battery cell.

5. The battery module of claim 4, wherein:
the frame comprises spacing protrusions extending inside the frame in the insertion hole; and
the second surface of the first plate and the second surface of the second plate are seated on the spacing protrusions and spaced apart by the spacing protrusions.

6. The battery module of claim 1, wherein:
the first plate further comprises seating protrusions;
the bus bar is seated on the seating protrusions and spaced apart from second surface of the first plate by the seating protrusions; and
the cutter is disposed between the seating protrusions.

7. The battery module of claim 1, wherein the bus bar comprises a weak part comprising a small width in a movement direction of the cutter.

8. The battery module of claim 1, wherein the bus bar is fixedly coupled to the first plate.

9. The battery module of claim 1, wherein:
the second plate further comprises reinforcing ribs and a deformation part formed in a center part of the second plate at which the reinforcing ribs are not disposed; and
the cutter is formed at the deformation part.

10. The battery module of claim 1, further comprising:
a first cover disposed at an external side of the first battery cell; and
a second cover disposed at an external side of the second battery cell,
wherein the first cover and the second cover are configured to restrict expansion of the first battery cell and the second battery cell, respectively, such that the first battery cell and the second battery cell expand towards the overcharge preventing device, during expansion of the battery cell.

11. The battery module of claim 1, wherein the first plate, the second plate, and the cutter are formed of an insulating material.

12. An overcharge preventing device for a battery module, which is disposed between a first battery cell and a second battery cell of a battery cell in the battery module, the overcharge preventing device comprising:
a frame disposed between the first battery cell and the second battery cell;
a first date disposed in the frame adjacent to the first battery cell;
a second plate disposed in the frame adjacent to the second battery cell; and
a bus bar disposed on the second plate at an inner side of the frame, and comprising one end connected to the first battery cell and another end connected to the second battery cell to make the first battery cell and the second battery cell be electrically conducted,
wherein the bus bar is configured to be cut by deformation of the first plate due to expansion of the battery cell.

13. The overcharge preventing device of claim 12, wherein:
the first plate comprises a first surface configured to contact the first battery cell, and a second surface on which the bus bar is seated;
the second plate comprises a first surface configured to contact the second battery cell, and a second surface facing the second surface of the first plate with the bus bar interposed between the second surface of the second plate and the second surface of the first plate; and
a cutter formed on the second surface of the second plate and configured to move towards the bus bar to cut the bus bar in response to expansion of the battery cell.

14. The overcharge preventing device of claim 13, wherein:
the first plate comprises seating protrusions protruding from the second surface of the first plate;
the bus bar is seated on the seating protrusions and spaced apart from the second surface of the first plate by the seating protrusions; and
the cutter is disposed between the seating protrusions.

15. The overcharge preventing device of claim 13, wherein:
the bus bar further comprises a weak part configured to be cut by the cutter; and
the weak part comprises a small width in a movement direction of the cutter.

16. The overcharge preventing device of claim 13, wherein:
the second plate further comprises reinforcing ribs and a deformation part formed at a center part of the second plate at which the reinforcing ribs are not disposed; and
the cutter is formed at the deformation part.

17. The overcharge preventing device of claim 13, wherein the first plate, the second plate, and the cutter are formed of an insulating material.

18. The overcharge preventing device of claim 12, wherein the bus bar is fixedly coupled to the first plate.

19. The overcharge preventing device of claim 12, wherein:
the frame comprises an insertion hole;
the first plate and the second plate are disposed in the insertion hole and spaced apart from each other inside the insertion hole; and
the first plate and the second plate are configured to deform in a direction in which the first plate and the second plate face each other, in response to expansion of the battery cell.

20. The overcharge preventing device of claim 19, wherein:
the frame comprises spacing protrusions extending inside the frame in the insertion hole; and
the second surface of the first plate and the second surface of the second plate are seated on the spacing protrusions and spaced apart by the spacing protrusions.

* * * * *